July 17, 1962 C. A. BROWNELL, JR Re. 25,199

METHOD OF CONSTRUCTING SWIMMING POOLS

Original Filed June 28, 1955 2 Sheets-Sheet 1

Carl A. Brownell, Jr.
INVENTOR.

BY Clarence A. O'Brien and Harvey B. Jacobson
Attorneys

July 17, 1962 C. A. BROWNELL, JR Re. 25,199

METHOD OF CONSTRUCTING SWIMMING POOLS

Original Filed June 28, 1955 2 Sheets-Sheet 2

Carl A. Brownell, Jr.
INVENTOR.

BY Clarence A. O'Brien and Harvey B. Jacobson
Attorneys

United States Patent Office

Re. 25,199
Reissued July 17, 1962

25,199

METHOD OF CONSTRUCTING SWIMMING POOLS

Carl A. Brownell, Jr., 3123 South U.S. 23, Greenbush, Mich.

Original No. 2,887,759, dated May 26, 1959, Ser. No. 518,599, June 28, 1955. Application for reissue May 23, 1961, Ser. No. 115,853
5 Claims. (Cl. 25—155)

Matter enclosed in heavy brackets [ ] appears in the original patent but forms no part of this reissue specification; matter printed in italics indicates the additions made by reissue.

This invention relates generally to swimming pool construction and more particularly to a novel process of constructing a swimming pool.

The primary object of the present invention resides in *a method* [the provision] of *constructing* a swimming pool which may be constructed in a simple and inexpensive manner *to have* [and which has] a suitable liner forming the surfacing of the pool.

[A further object of the invention resides in the provision of a swimming pool of great strength due to its shape and manner of construction and which does not require complex reinforcing arrangements for the mix used in molding the walls of the pool.]

[The construction of this invention features the utilization of a liner of any suitable tough and thin material such as a shell made from a synthetic plastic material or which may be formed of other suitable substances and which is supported on suitable members such as stakes or the like in spaced relationship to the sides of a cavity formed in the ground at the site of the pool. A cementitious mix is poured into the space between the walls of the cavity and the liner and forms a bond with the liner. Simultaneous with the pouring of the mix the liner is filled with water for the purpose of weighting the liner into bonding relationship with the mix.]

*The method includes the steps of excavating an upwardly opening, relatively shallow cavity, positioning a liner of any suitable tough and thin material such as a shell made from a synthetic plastic material within the cavity while maintaining the liner in spaced relationship with the cavity such that there is substantially equidistant spacing between the liner and the walls of the cavity, and introducing a fill such as cement into the space between the liner and cavity while simultaneously introducing water into the liner.*

These, together with the various ancillary objects and features of the invention which will become apparent as the following description proceeds, are attained by this [swimming pool and] method of construction [thereof], a preferred embodiment of the pool being shown in the accompanying drawings, by way of example, wherein.

Figure 5:
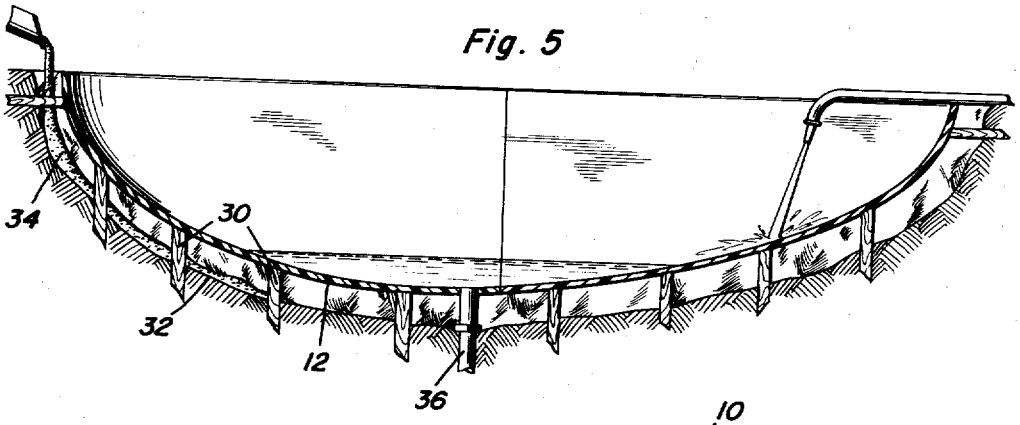
Figure 6:
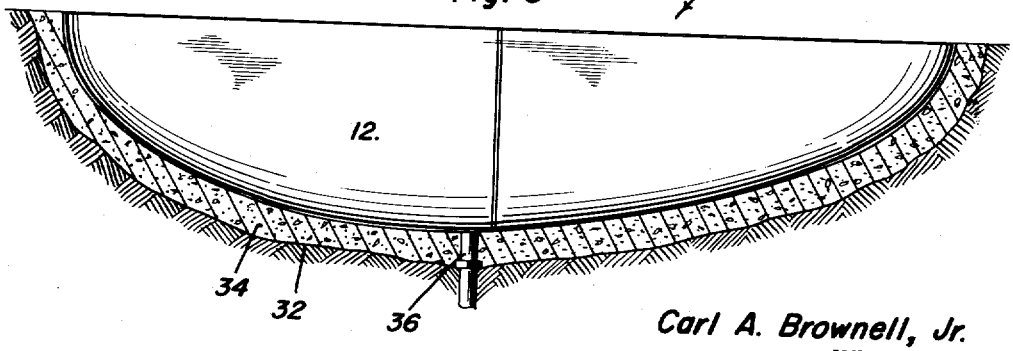

FIGURE 5 is a vertical sectional view illustrating the swimming pool liner in position and suitably supported in spaced relationship to the walls of the cavity and further illustrating the manner in which the base of cementitious matter or the like is poured into the space between the liner and the walls of the cavity while the liner is filled simultaneously with water to weight the liner; and FIGURE 6 is a vertical sectional detail view of the swimming pool shown in its completed state.

With continuing reference to the accompanying drawings wherein like reference numerals designate similar parts throughout the various views, reference numeral 10 generally designates the swimming pool constructed in accordance with the concepts of the present invention. This swimming pool includes a liner 12 bonded to a base 14 of concrete, asphalt, or other suitable cementitious or plastic material.

Figure 1:
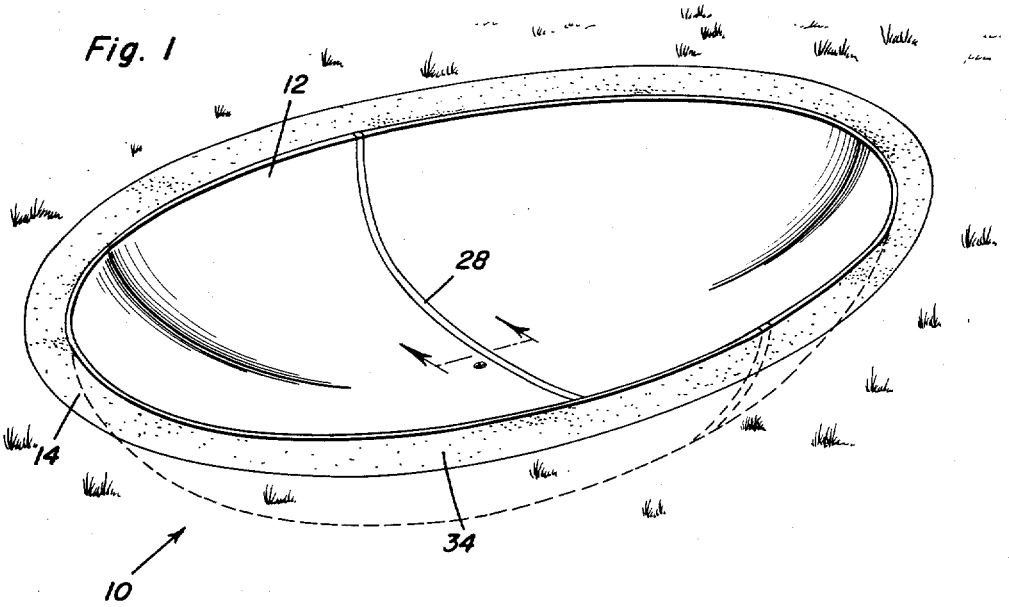
FIGURE 1 is a perspective view illustrating the swimming pool.
Figure 2:
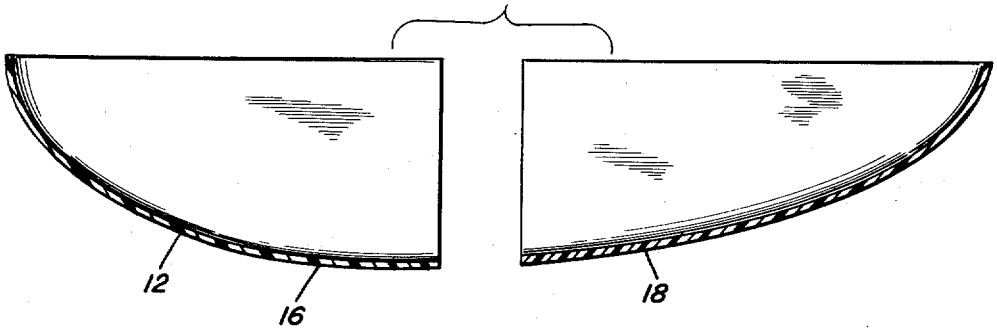
FIGURE 2 is an exploded longitudinal sectional view of the liner forming one of the important elements of the invention.
Figure 3:
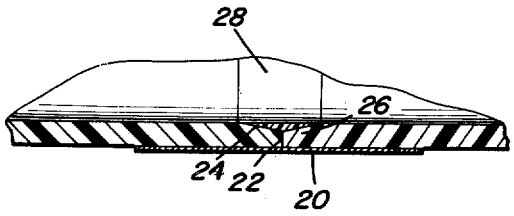
FIGURE 3 is an enlarged sectional detail as taken along the plane of line 3—3 in FIGURE 1 and illustrating how segments of the swimming pool liner are joined together.
Figure 4:
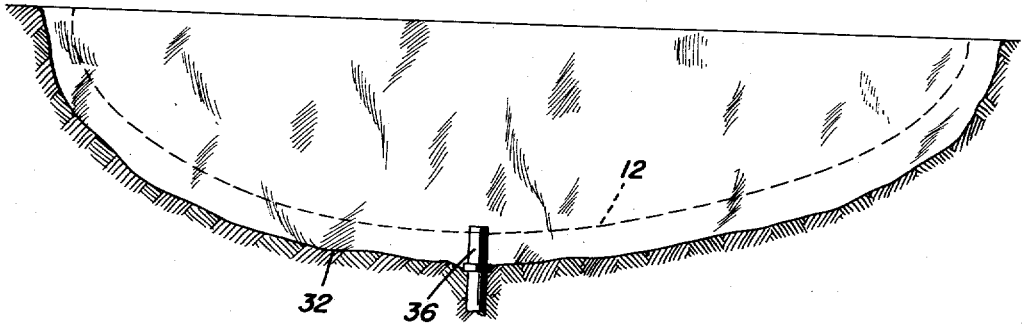
FIGURE 4 is a vertical sectional view illustrating the cavity formed at the site of the swimming pool to be constructed and illustrating the drain pipe in position prior to the placement of the liner, the position of the liner being shown in phantom lines.

The liner 12 may be formed out of a single unitary molded member or may be formed in two or more sections which are bonded together as can be best seen in FIGURES 2 and 3. The sections of the liner 12 which are indicated at 16 and 18 may be joined together by an underlying strip 20 at the joint 22 between the abutting edges of the sections 16 and 18 of the liner 12 and the abutting edges may have beveled portions as at 24 and 26 so that a sealing strip 28 of generally triangular cross-section can be positioned thereon and bonded to the respective sections 16 and 18 to hold the sections 16 and 18 together while still providing a full surface for the liner 12.

In constructing the pool, the liner is positioned on stakes such as are indicated at 30 and supported in spaced relationship from the walls 32 formed by the cavity excavated at the site of the pool to be constructed.

After the liner 12 has been positioned on the stakes 30 so as to be held in spaced relationship with the walls of the cavity 32, simultaneously, a mix *or slurry* of cementitious material 34, an asphalt, or the like, is poured into such space while water is poured into the liner 12 at a corresponding weight, the water serving to force the liner 12 downwardly into the mix 34 and causing a *settling* [bonding] action. An outlet pipe 36 may be provided in the liner 12 at any suitable point for disposal of the water in the pool when desired.

Alternatively, the swimming pool may be constructed by first excavating a cavity at the site of the proposed swimming pool slightly larger in all dimensions than the pool to be constructed. Then, a quantity of cementitious material in its plastic or fluid form which will when hardened and cured have a high compression strength may be poured into the bottom of the cavity. While the cementitious material is still fluid the liner 12 of high tensile strength may be positioned on top of the cementitious material approximately equidistant away from the walls of the cavity. Then, water may be added inside the liner as necessary to sink the liner into the cementitious material so as to leave a quantity of the cementitious material under the bottom of the liner and adjusting and leveling the liner into its final position holding the liner in position by any conventional means. Then, the cementitious material may be permitted to cure until it is sufficiently hard and firm to hold the liner in position after which additional cementitious material may be poured in one or more steps into the remaining cavity between the sides of the liner and the sides of the cavity until the cementitious material fills the cavity to the height of the top of the liner. Simultaneously with this final filling operation the liner can be filled with water to prevent the liner from floating or moving from its original position.

The liner 12 is similar in shape to half an egg thereby providing portions of different depth while assuring that great and unexpected strength for the pool will be achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The process of constructing a swimming pool which comprises the steps of excavating an upwardly opening and relatively shallow, dish-shaped cavity, placing a plurality of support members within such cavity, positioning a generally dish-shaped, imperforate liner within the cavity and upon the support members with substantially equidistant spacing between the liner and the walls of the cavity, pouring a cementitious mix into the space between the liner and cavity while simultaneously introducing water into the liner, and maintaining the flow of cementitious mix and water at rates such that the volume of water in the liner is always of a weight greater than the buoyant force of the cementitious mix on the liner.

2. A process of constructing a swimming pool, comprising the steps of excavating an upwardly opening and relatively shallow dish-shaped cavity, pouring a cementitious mix in the bottom of the cavity, positioning a shallow dish-shaped imperforate liner on the cementitious mix in the bottom of the cavity before the mix has hardened so that the sides of the liner are spaced from the sides of the cavity and simultaneously pouring water into the liner for weighting the same, allowing said cementitious mix to harden, then pouring additional cementitious mix into the space between the sides of the liner and the sides of the cavity and simultaneously pouring additional water into the liner for weighting the same while maintaining the flow of the cementitious mix and water at rates such that the volume of water in the liner always of a weight greater than the buoyant force of the cementitious mix on the liner.

*3. The process of constructing a swimming pool which comprises the steps of excavating an upwardly opening and relatively shallow cavity, supporting a relatively shallow, imperforate liner within the cavity and positioning the liner to provide substantially equidistant spacing between the liner and the walls of the cavity, introducing a plastic fill into the space between the liner and cavity while simultaneously introducing water into the liner, and maintaining the flow of fill and water at rates such that the volume of water in the liner is always of a weight greater than the buoyant force of the fill on the liner.*

*4. The process of constructing a swimming pool which comprises the steps of excavating an upwardly opening and relatively shallow cavity, positioning a generally dish-shaped, imperforate liner within the cavity while maintaining the liner in spaced relationship with the cavity so that the liner walls are spaced substantially equidistant from the walls of the cavity, introducing a slurry fill into the space between the liner and cavity while simultaneously introducing water into the liner, and maintaining the flow of fill and water at rates such that the volume of water in the liner is always of a weight greater than the buoyant force of the fill on the liner.*

*5. The process of constructing a swimming pool which comprises the steps of excavating an upwardly opening and relatively shallow cavity, positioning a generally dish-shaped, imperforate liner within the cavity while maintaining the liner in spaced relationship with the cavity so that the liner walls are spaced substantially equidistant from the walls of the cavity, introducing cement into the space between the liner and cavity while simultaneously introducing water into the liner, and maintaining the flow of cement and water at rates such that the volume of water in the liner is always of a weight greater than the buoyant force of the cement on the liner.*

References Cited in the file of this patent or the original patent

UNITED STATES PATENTS

| | | |
|---|---|---|
| 1,372,856 | Winterbottom | Mar. 29, 1921 |
| 1,963,405 | Eichelman et al. | June 19, 1934 |
| 2,333,315 | Klingberg | Nov. 2, 1943 |
| 2,376,414 | Billner et al. | May 22, 1945 |
| 2,382,171 | Pomykala | Aug. 14, 1945 |
| 2,617,764 | Hauber et al. | Nov. 11, 1952 |
| 2,624,931 | Billner | Jan. 13, 1953 |
| 2,674,775 | Willson | Apr. 13, 1954 |